(12) United States Patent
Meier

(10) Patent No.: US 10,995,929 B2
(45) Date of Patent: May 4, 2021

(54) PROJECTION DEVICE, REAR-VIEW DEVICE AND MOTOR VEHICLE

(71) Applicant: SMR Patents S.à.r.l., Luxembourg (LU)

(72) Inventor: Eugen Meier, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/633,813

(22) PCT Filed: Jul. 25, 2018

(86) PCT No.: PCT/EP2018/070223
§ 371 (c)(1),
(2) Date: Jan. 24, 2020

(87) PCT Pub. No.: WO2019/020712
PCT Pub. Date: Jan. 31, 2019

(65) Prior Publication Data
US 2020/0173625 A1 Jun. 4, 2020

(30) Foreign Application Priority Data
Jul. 27, 2017 (DE) ..................... 10 2017 117 027.8

(51) Int. Cl.
*F21S 43/20* (2018.01)
*F21S 43/16* (2018.01)
(Continued)

(52) U.S. Cl.
CPC ................ *F21S 43/16* (2018.01); *B60Q 9/00* (2013.01); *B60R 1/06* (2013.01); *B60R 11/04* (2013.01);
(Continued)

(58) Field of Classification Search
CPC ............. F21S 43/50; F21S 43/26; F21S 43/16
(Continued)

(56) References Cited

U.S. PATENT DOCUMENTS

| 6,299,333 B1* | 10/2001 | Pastrick | B60Q 1/2665 340/475 |
| 7,878,693 B2* | 2/2011 | Liesener | B60Q 1/2665 362/494 |

(Continued)

FOREIGN PATENT DOCUMENTS

| JP | 2014007093 A | 1/2014 |
| KR | 20130101734 A | 9/2013 |

(Continued)

OTHER PUBLICATIONS

International Search Report dated Oct. 26, 2018 of International application No. PCT/EP2018/070223.
(Continued)

*Primary Examiner* — Christopher M Raabe
(74) *Attorney, Agent, or Firm* — Jones Day

(57) ABSTRACT

A projection device for projecting an optical information, in the form of a logo or warning signal, onto a projection surface, includes a light source that has an emission maximum at a first wavelength, a mask disposed in the beam path of the light source, with at least one opening providing the optical information, and at least one optical lens disposed in the beam path. The mask and/or the lens may have a coating with at least one illuminant, the excitation wavelength of which corresponds to the first wavelength and which emits light with at least one second wavelength. A rearview device and a motor vehicle may also include the projection device.

10 Claims, 2 Drawing Sheets

(51) Int. Cl.
*B60Q 9/00* (2006.01)
*B60R 1/06* (2006.01)
*B60R 11/04* (2006.01)
*B60R 11/00* (2006.01)

(52) U.S. Cl.
CPC ......... *F21S 43/26* (2018.01); *B60R 2011/004* (2013.01)

(58) Field of Classification Search
USPC .......................................................... 362/520
See application file for complete search history.

(56) References Cited

U.S. PATENT DOCUMENTS

| | | | |
|---|---|---|---|
| 9,604,568 B1 | 3/2017 | Salter et al. | |
| 2005/0117364 A1* | 6/2005 | Rennick | B60Q 1/2665 362/540 |
| 2014/0191859 A1* | 7/2014 | Koelsch | B60Q 1/2665 340/455 |
| 2015/0197187 A1* | 7/2015 | Salter | B60Q 1/323 362/510 |
| 2017/0066386 A1* | 3/2017 | Sawada | B60Q 1/2665 |
| 2018/0257546 A1* | 9/2018 | Johnson | F21S 43/16 |

FOREIGN PATENT DOCUMENTS

| | | |
|---|---|---|
| WO | WO 2016/167056 A1 | 10/1916 |
| WO | WO 2013/094222 A1 | 6/2013 |

OTHER PUBLICATIONS

International Preliminary Report on Patentability dated Oct. 29, 2019 of International application No. PCT/EP2018/070223.
Written Opinion dated Oct. 26, 2018 of International application No. PCT/EP2018/070223.

* cited by examiner

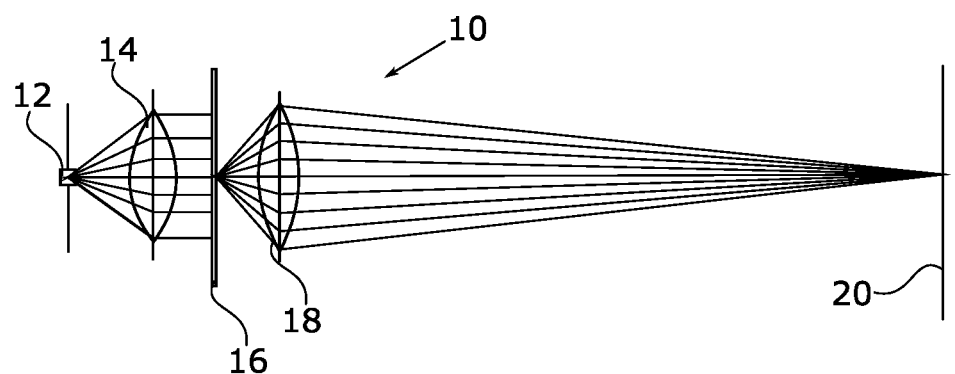
Fig. 1 (Stand der Technik)
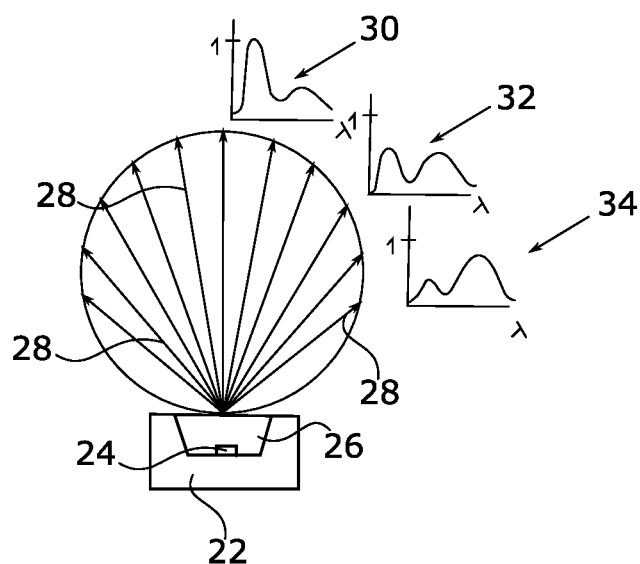
Fig. 2 (Stand der Technik)

PROJECTION DEVICE, REAR-VIEW DEVICE AND MOTOR VEHICLE

CROSS-REFERENCE TO RELATED APPLICATIONS

This application is a National Stage Entry of International Patent Application No. PCT/EP2018/070223, filed Jul. 25, 2018, which claims the benefit of foreign priority to German Patent Application No. DE 10 2017 117 027, filed Jul. 27, 2017, each of which is hereby incorporated by reference in its entirety for all purposes.

BACKGROUND

1. Field of the Invention

The present disclosure relates to a projection device for projecting a logo and a rearview device and a motor vehicle with such a projection device.

2. Related Art

A rearview device for a motor vehicle delivers an image of the rear area of the motor vehicle that at least conforms to the statutory requirements and belongs to a sub-group of devices for an indirect view. These deliver images and views of objects that are not located in the direct field of view of a driver, in other words, in directions that are opposite, to the left, to the right, below and/or above the direction of view of the driver. The view of the driver can in particular also not be fully satisfactory in the direction of view; for example, obstructions to the view can result from vehicle parts of one's own vehicle, such as parts of the body, in particular the A-column, the roof construction and/or the bonnet, and obstructions to the view can result from other vehicles and/or objects outside of the vehicle that can obstruct the view such that the driver cannot entirely satisfactorily or only incompletely understand the driving situation. In addition, it is possible that the driver is not in a position to understand the situation present to them or beyond their direction of view, as would be necessary in order to control the vehicle in accordance with the situation. For this reason, a rearview device can also be designed such that it provides information according to the abilities of the driver, in order to enable them to understand the situation in the best possible way.

Different functions and appliances can be installed in rearview devices and/or be controlled with the aid of rearview devices, wherein in particular, these comprise cameras. Functions and appliances for the improvement, extension and/or maintenance of the functionality of the rearview device under normal or extreme conditions are particularly useful. These can comprise heating and/or cooling facilities, cleaning agents such as wipers, liquid and/or gaseous sprays, actuator means for moving the rearview devices or parts thereof, such as a display, a camera system and/or parts of a camera system, comprising e.g. lenses, filters, light sources, adaptive optics such as deformable mirrors, sensors and/or mirrors, and/or actuator means for the induction of movements of other objects, e.g. parts of the vehicle and/or objects that surround the vehicle.

Further facilities can be integrated into rearview devices, and/or further facilities can be controlled with the aid of rearview devices, such as any type of light module, comprising an external light module, an internal light module, a front light, a rear light, a fog headlight, a braking light, an acceleration light, a flashing light, a logo light, front area illumination, a floor light, a puddle light, a flashlight, a navigation light, a position light, an emergency light, a headlight, a green light, a red light, a warning light, a flashing light light module, an approach light, a searchlight, an information light, a display and/or similar. Further examples of functions and devices that are integrated and/or controlled with the aid of rearview devices can, for example, be a fatigue detection system, a microsleep detection system, a range and/or velocity determination system, such as a LIDAR (light detection and ranging) system, a blind angle indication system, a lane change assistance system, a navigation assistance system, a tracking assistant system, a human-machine interaction system, a machine-machine interaction system, an emergency and precautionary measure assistance system, such as an accident prevention assistance system, a countermeasure assistance system, a braking assistance system, a steering assistance system, an acceleration assistance system, an escape assistance system, which comprises an ejector seat system, for example, a direction indicator, a blind angle indicator, an approach system, an emergency brake system, a loading status display, a driving mode system, which comprises, for example, a sport mode system, an economy mode system, an autonomous driving mode system, a sleep mode system and/or an anti-theft system, a vehicle locked indication system, a vehicle stolen display, a warning signal system, a temperature indicator system, a weather indication system, a traffic light signal system, a fuel status system and/or any combinations of these.

Illumination facilities for rearview devices and/or light guides are described in German patent application no. 102012108488, in German patent application no. 102012104529, in German patent application no. 102012107833, in German patent application no. 102012107834, in European patent no. 2738043, in European patent no. 2947378, in international patent application no. 2015/173695, in European patent application no. 3045944, in U.S. patent application Ser. Nos. 15/228,566, 15/000,733, in international patent application no. 2016/147154, in U.S. patent application Ser. No. 15/256,532, in German patent application no. 102015115555, in European patent application no. 3144183, of the applicant.

Projection devices for projecting optical information can for example be used in a motor vehicle in order to project a manufacturer's logo or a warning signal onto an area located outside the motor vehicle. One example of such a known projection device 10 is shown in FIG. 1. A light source 12 generates light which is bundled by a collimator lens 14 and which falls onto a mask 16. The mask 16 has e.g. a perforated pattern which corresponds to the information to be projected. The light falling through the mask 16 is focused by a display lens 18 onto a projection surface 20, such as the road lane. Here, several problems arise that may impair the display quality.

Initially, white light diodes 22 are usually used as a light source 12. Such a light diode 22 is shown schematically in FIG. 2. Since white light cannot be generated directly via standard semiconductor elements, such light diodes 22 have a semiconductor chip 24, which emits light in the ultraviolet and/or blue spectral range. The semiconductor chip 24 is embedded in a material 26 that comprises different illuminants, also known as phosphors or luminophores. These are excited to create fluorescence by the light generated by the semiconductor chip 24 and themselves emit light with an essentially white colour impression.

The problem here is that the distance of the light generated by the semiconductor chip 24 through the material 26 depends on the angle of reflection of a respective light beam 28. Thus, the number of absorption and reemission processes in the material is also dependent on the direction of the light beam 28. For this reason, the colour impression of the light diode 22 differs depending on the angle of observation. This effect is known as "colour over angle" and is depicted by the three angle-dependent spectra 30, 32, 34 shown in FIG. 2, in which the relative intensity of the emitted light is respectively applied against the wavelength for three different beam angles.

If such a light diode 22 is used in a projection device 10 according to FIG. 1, the colour impression of the logo projected onto the projection surface 20 thus changes from the middle section of the logo to its edge section. In addition to this display error, there are influences due to the chromatic aberration of the lenses 14, 18. Furthermore, with each penetration of a light beam through a boundary area between lenses 14, 18 and the mask 16 and air, reflection losses occur as a result of so-called Fresnel reflection.

SUMMARY

This object is attained by means of a projection device and a motor vehicle illumination device with at least one such projection device for projecting an optical information, in particular in the form of a logo or warning signal, onto a projection surface, with a light source that has an emission maximum at a first wavelength, a mask disposed in the beam path of the light source, with at least one opening providing the optical information, and at least one optical lens disposed in the beam path, wherein the mask and/or the lens has or have a coating with at least one illuminant, the excitation wavelength of which corresponds to the first wavelength and which emits light with at least one second wavelength.

The motor vehicle illumination device with the at least one projection device enables a specific projection of an optical information, depending on the embodiment, for example in the form of a logo, as well as an unspecific projection of an optical information, for example as a projection of a coloured area (for example as a warning signal) onto a projection surface. The motor vehicle illumination device can, in one embodiment, be a rearview device for a motor vehicle.

Thus, in an example, the wavelength conversion is achieved by means of the at least one illuminant, not in the light source itself, but only on the mask and/or the lens. As a result, the angle-dependent colour deviations of the prior art described above are avoided since the path length for each light beam emitted by the light source through the mask or lens is essentially independent from the exit angle of the light beam from the light source. Thus, a particularly good colour consistency of the projection is attained. In addition, depending on the light source used, there is no need for a collimator lens, so that image errors resulting from the chromatic aberration of the optics and the Fresnel intensity losses are particularly low.

With one preferred embodiment of the invention, the coating contains phosphor, which themselves can be different illuminants, so that, for example, the excitation wavelength of the emission wavelengths can correspond to at least one of the illuminants, and/or emission wavelengths can be emitted that differ from the first wavelength. The illuminants can be selected to improve the emission spectrum so that a particularly good colour impression of the projected optical information is created.

With one further preferred embodiment of the invention, the light source comprises at least one blue laser diode. A laser diode has a particularly well-directed beam characteristic. Thus, the mask can be fully irradiated with essentially consistent intensity, without a collimator lens being required in front of the mask. Due to the omission of a lens in the beam path, reflection and absorption losses are kept particularly low, so that a particularly high light intensity of the projected information can be guaranteed.

Here, "blue" should be understood such that at least one partial area of the emission spectrum lies in the visibly blue range. Naturally, such a laser diode can also emit in the ultraviolet spectral range.

With one further preferred embodiment of the invention, the light source comprises at least one blue light-emitting diode. Light-emitting diodes can therefore also be used as an alternative to laser diodes. These are at least a more cost-effective alternative, but require a collimator lens, as light-emitting diodes have a broader beam angle than laser diodes. With a collimator lens, which bundles the beam path onto the mask, an improved light yield can in this case be achieved. However, there is no need for the collimator lens when laser diodes are used.

It can therefore be provided that at least one lens comprises a display lens in the beam path after the mask, wherein a collimator lens is preferably disposed in the beam path between the light source and the mask, in particular when the light source comprises the at least one blue light-emitting diode.

With a further preferred embodiment of the invention, an emission spectrum emitted by the coating appears essentially white to an observer when excited by the light source. As a result, a particularly clear and highly visible projection of the optical information is achieved. This can be attained by means of the suitable mixture of illuminants in the coating.

Here, "white" should be understood as being one of the characterisations of human colour perception in the range of the illumination technology. For example, it can be emitted light with a colour temperature between 3000 K and 5000 K, or also emitted light in the range of the white point of the CIE or tristimulus colour space.

The optical information can be a symbol, a logo, a text or similar. As a result, both purely decorative information, if necessary, also advertising, such as a manufacturer's logo, as well as signals to other traffic participants, such as an item of information in the form of a warning triangle, can be projected.

In one embodiment, the projection device is provided to project the item of optical information as a logo light, as a warning light, as an approach light, as a searchlight, as a display, as a ground light, as a puddle light, as a flashlight, as a position light, as an emergency light, as an acceleration light, as a view light, as decorative information, as advertising information, as a manufacturer's logo and/or as a warning triangle onto a projection surface.

The present disclosure further relates to a rearview device and also to a motor vehicle with a projection device according to the present disclosure. Here, too, the advantages already described come to bear.

The present disclosure further relates to a motor vehicle with at least one motor vehicle illumination device with at least one projection device. Here, too, the advantages already described come to bear.

With one preferred embodiment of the present disclosure, the projection device is designed to project the logo onto a surface located outside of the motor vehicle, in particular a road lane surface. Thus, no special external projection surfaces are required in order to display the desired optical information. The projection can thus be conducted at any place required.

With a further preferred embodiment of the present disclosure, the projection device is disposed in or on an outer mirror or other rearview device, or also on an external camera holder of the motor vehicle.

In this manner, the projection device can be integrated into an external component of the motor vehicle that is already available so that no additional external installed parts are required on the motor vehicle.

BRIEF DESCRIPTION OF THE DRAWINGS

The present disclosure and its embodiments will now be explained in greater detail below with reference to drawings, in which:

FIG. 1 shows a schematic view of a projection device according to the prior art;

FIG. 2 shows a schematic depiction of the beam characteristics of a white light-emitting diode;

DETAILED DESCRIPTION

Figure 3:
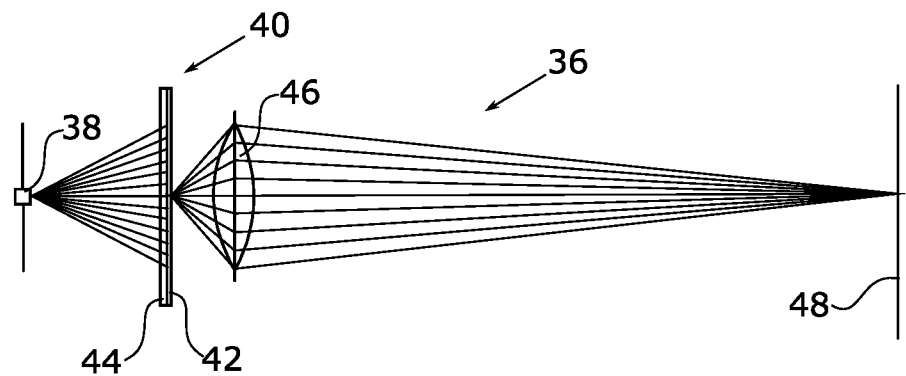
FIG. 3 shows a schematic view of an exemplary embodiment of a projection device with a laser diode as a light source.

A projection device according to an example of the present disclosure, labelled 36 in FIG. 3, comprises a light source 38 in the form of a blue laser diode, which radiates a mask 40. Naturally, a plurality of laser diodes can also be used.

The mask 40 comprises a mask layer 42, which has a plurality of openings not shown in FIG. 3, which define an item of optical information to be projected. Further, the mask 40 comprises a coating 44, which contains at least one illuminant. In the example shown, the coating is disposed on the side of the mask 40 facing towards the light source 38; the coating 44 can however also be applied on the other side of the mask 40 or also on both sides, in particular when the mask 40 is partially optically transparent.

The illuminant or illuminants of the coating 44 are excited by the light radiated by the light source 38 to create fluorescence and/or phosphorescence. Through a suitable mixture of the illuminants, it can be achieved that the emitted light has an essentially white colour characteristic.

The illuminants can for example be crystalline anorganic oxides or sulphides, which are dosed with rare earth metals, in particular with lanthanoids such as yttrium, europium, erbium or terbium. Naturally, other anorganic or organic illuminants can also be used if they have the desired excitation and emission characteristic.

If necessary, a protective layer, not shown, can also be applied to the coating 44, which protective layer is optically transparent, and which protects the coating 44 from environmental influences.

The light, which is emitted by the coating 44 and the mask layer 42 in the form of the desired optical information is focussed in the further beam path onto a projection surface 48 by a display lens 46.

In addition, or as an alternative to the coating 44 on the mask 40, the display lens 46 can here also have a coating, not shown, with the above illuminants.

Due to the spectrally consistent emission of the coating 44, an image of the optical information is thus created on the projection surface 48 which has a particularly good intensity and a consistent light colour, from the middle section through to the edge section of the display.

The projection surface 48 can for example by any surface located outside of a vehicle. A projection of logos, signals, text notifications or similar onto a road lane in the vicinity of the vehicle is particularly advantageous.

Figure 4:
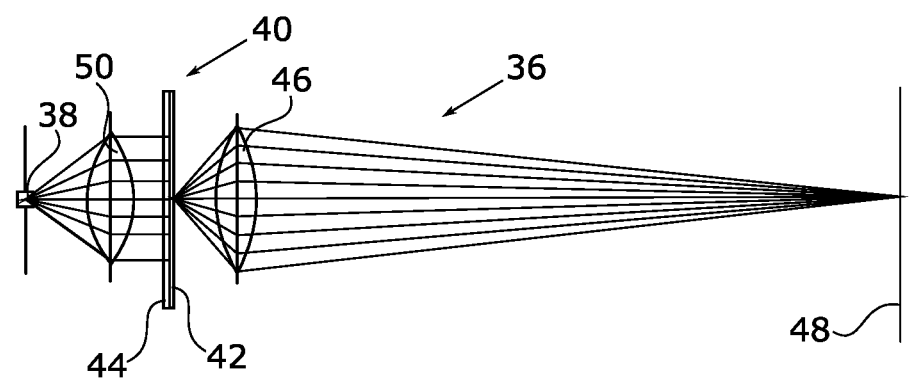
FIG. 4 shows a schematic view of another exemplary embodiment of a projection device with a light-emitting diode as a light source.

FIG. 4 shows an alternative design of the projection device 36 according to an example of the present disclosure. Here, instead of a laser diode, a blue light-emitting diode or a plurality of blue light-emitting diodes are used as a light source 38.

The fundamental structure of the projection device 36 remains unaffected. The same components are therefore assigned the same reference numerals. Since, however, a light-emitting diode has a broader beam angle than a laser diode, in this case it is advantageous when a collimator lens 50 is additionally provided between the light source 38 and the mask 40. As a result, the intensity of the light falling onto the coating 44 is increased, which improves the light yield of the projection.

Overall, a projection device 36 is thus obtained with which a particularly colour consistent projection of an item of optical information is achieved, at the same time with a particularly high light intensity.

The features of the invention disclosed in the above description, in the claims and in the drawings can be essential both individually and in any combination required for the realisation of the invention in its different embodiments.

LIST OF REFERENCE NUMERALS

10 Projection device
12 Light source
14 Collimator lens
16 Mask
18 Display lens
20 Projection surface
22 White light diode
24 Semiconductor chip
26 Material
28 Light beam
30 Spectrum
32 Spectrum
34 Spectrum
36 Projection device
38 Light source
40 Mask
42 Mask layer
44 Coating
46 Display lens
48 Projection surface
50 Collimator lens

What is claimed is:

1. A motor vehicle illumination device with at least one projection device which is part of a rearview device comprising one or more of an exterior mirror or an exterior camera holder of a motor vehicle, the motor vehicle illumination device being designed for projecting an optical information in form of a logo or a warning signal onto a projection surface outside of the motor vehicle, the motor vehicle illumination device comprising:

a light source comprising an emission maximum at a first wavelength;

a mask disposed in the beam path of the light source with at least one opening providing the optical information; and at least one optical lens disposed in the beam path, wherein the mask has a coating with at least one illuminant, the excitation wavelength of which corresponds to the first wavelength and which emits light with at least one second wavelength.

2. The motor vehicle illumination device according to claim 1, wherein the coating contains phosphor as illuminant.

3. The motor vehicle illumination device according to claim 1, wherein the light source comprises at least one blue laser diode or one blue light-emitting diode or emits UV light.

4. The motor vehicle illumination device according to claim 1, wherein an emission spectrum emitted by the coating appears essentially white to an observer when excited by the light source.

5. The motor vehicle illumination device according to claim 1, wherein the at least one lens comprises a display lens in the beam path after the mask, and a collimator lens is disposed in the beam path between the light source and the mask when the light source comprises that least one blue light-emitting diode.

6. The motor vehicle illumination device according to claim 1, wherein the coating is:

disposed on a side of the mask facing towards the light source, disposed on an opposite side of the mask, or disposed on both sides of the mask and the mask is partially optically transparent.

7. The motor vehicle illumination device according to claim 1, wherein the projection device is provided to project the optical information as a logo light, as a warning light, an approach light, a searchlight, a display, a ground light, a puddle light, a flashlight, a position light, an emergency light, an acceleration light, a view light, decorative information, advertising information, a manufacturer's logo, or a warning triangle onto a projection surface.

8. A motor vehicle with at least one motor vehicle illumination device according to claim 1, wherein the projection surface is provided by a ground such as a road lane surface adjacent to the motor vehicle.

9. The motor vehicle illumination device according to claim 1, wherein the at least one lens also has a coating with at least one illuminant, the excitation wavelength of which corresponds to the first wavelength and which emits light with at least one second wavelength.

10. The motor vehicle illumination device according to claim 5, wherein at least one of the display lens and the collimator lens also has a coating with at least one illuminant, the excitation wavelength of which corresponds to the first wavelength and which emits light with at least one second wavelength.

* * * * *